(12) United States Patent
Ogino (10) Patent No.: US 6,885,763 B2
(45) Date of Patent: Apr. 26, 2005

(54) IMAGE PROCESSING METHOD AND APPARATUS, RECORDING MEDIUM, AND IMAGING APPARATUS

(75) Inventor: Tetsuo Ogino, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 664 days.

(21) Appl. No.: 09/883,820

(22) Filed: Jun. 18, 2001

(65) Prior Publication Data

US 2002/0054698 A1 May 9, 2002

(30) Foreign Application Priority Data

Aug. 18, 2000 (JP) ........................................ 2000-248280

(51) Int. Cl.$^7$ ................................................ G06K 9/00
(52) U.S. Cl. ...................... 382/131; 382/205; 382/228; 382/194; 382/275
(58) Field of Search ................................. 382/131, 205, 382/228, 194, 275, 128, 254, 260, 264, 272; 378/21; 250/455; 128/922; 356/39; 377/10; 600/443

(56) References Cited

U.S. PATENT DOCUMENTS

| | | | | |
|---|---|---|---|---|
| 5,262,725 A | * | 11/1993 | Cuppen et al. ............. | 324/312 |
| 5,802,218 A | * | 9/1998 | Brailean ...................... | 382/275 |
| 5,933,540 A | * | 8/1999 | Lakshminarayanan et al. .. | 382/260 |
| 6,059,729 A | * | 5/2000 | Stonger ...................... | 600/443 |
| 6,160,923 A | * | 12/2000 | Lawton et al. ............... | 382/275 |
| 6,208,763 B1 | * | 3/2001 | Avinash ...................... | 382/254 |
| 6,246,783 B1 | * | 6/2001 | Avinash ...................... | 382/128 |
| 6,256,403 B1 | * | 7/2001 | Florent et al. .............. | 382/128 |
| 6,466,687 B1 | * | 10/2002 | Uppaluri et al. ............ | 382/128 |
| 6,704,437 B1 | * | 3/2004 | He et al. ..................... | 382/128 |

FOREIGN PATENT DOCUMENTS

EP 0755023 1/1997

OTHER PUBLICATIONS

Ahn CB etal "Adaptive template filtering for signal–to–noise ratio enhancement in magnetic resonance imaging" IEEE Transaction on Medical Imaging. vol. 8,No. 6 6/99 ,pp 549–556.

Vila J–L etal "Directional adaptive image filtering:application to DNA sequence analysis" Proceedings of the Internal Conference on Image Processing,Austin; No. 13–16,vol. 3, Conf.1, pp 382–386.

Kido K. etal "improvment of MIR image quality by a directional adaptive filter" Systems and Computers in Japan Scripta Technica USA, Vo. 28,No. 10, 8/96 pp 69–76.

* cited by examiner

Primary Examiner—Bhavesh M. Mehta
Assistant Examiner—Barry Choobin
(74) Attorney, Agent, or Firm—Moonray Kojima (57) ABSTRACT

For the purpose of providing an image processing method for efficiently performing filtering, a local region containing a pixel of interest is defined in a plurality of modes in an original image (502); sequentially for the region in the plurality of modes, the variance of pixel values is obtained and a decision is made whether the value of the variance falls within a predetermined range (504, 506, 508 512, 514); and an image is produced using as a new pixel value for the pixel of interest an average value of pixel values of the region for which the value of the variance first falls within the range (508, 510, 524).

17 Claims, 11 Drawing Sheets

IMAGE PROCESSING METHOD AND APPARATUS, RECORDING MEDIUM, AND IMAGING APPARATUS

BACKGROUND OF THE INVENTION

The present invention relates to an image processing method and apparatus, a recording medium and an imaging apparatus, and more particularly to an image processing method and apparatus for removing noise of an image, a medium for recording a program for a computer to perform such an image processing function, and an imaging apparatus comprising such an image processing apparatus.

In a magnetic resonance imaging (MRI) apparatus, an object to be imaged is carried into an internal space of a magnet system, i.e., a space in which a static magnetic field is generated; a gradient magnetic field and a high frequency magnetic field are applied to generate a magnetic resonance signal inside the object; and a tomographic image is produced (reconstructed) based on the received signal.

In order for an observer to view a fine structure in the tomographic image in more detail, filtering is performed to remove noise in the image. Although the filtering is basically low-pass filtering, since the sharpness of the image is lowered by using the low-pass filtering alone, filtering with an additional process for preserving the sharpness is employed.

The filtering in combination with the process for preserving the sharpness involves defining in a plurality of modes a local region containing a pixel of interest in an original image, calculating the variance of pixel values for the local region in every mode, obtaining an average value of pixel values of the region having the minimum variance, and using the average value as a new pixel value for the pixel of interest.

Since such filtering, however, obtains the variances of pixel values for the local region in all the modes and thereafter extracts the minimum variance, the processing speed of the filtering is low.

SUMMARY OF THE INVENTION

Therefore, an object of the present invention is to provide an image processing method and apparatus for efficiently performing filtering, a medium for recording a program for a computer to perform such an image processing function, and an imaging apparatus comprising such an image processing apparatus.

(1) The present invention, in accordance with one aspect thereof for solving the aforementioned problem, an image processing method characterized in that the method comprises: defining in a plurality of modes a local region containing a pixel of interest in an original image; sequentially for said region in the plurality of modes, obtaining the variance of pixel values and deciding whether the value of said variance falls within a predetermined range; and producing an image using as a new pixel value for said pixel of interest an average value of pixel values of the region for which the value of said variance first falls within said range.

According to the invention in this aspect, since obtaining the variance of pixel values and deciding whether the value of the variance falls within a predetermined range are performed sequentially for a region in a plurality of modes, and an average value of pixel values of the region for which the value of the variance first falls within the range is used as a new pixel value for the pixel of interest, the number of calculations of the variance can be reduced, and the efficiency of filtering is improved.

(2) The present invention, in accordance with another aspect thereof for solving the aforementioned problem, is the image processing method as described regarding (1), characterized in that said region is a one-dimensional region.

According to the invention in this aspect, since, in addition to (1), the region for the variance calculation is a one-dimensional region, filtering which makes an edge-like structure distinct can be performed.

(3) The present invention, in accordance with still another aspect thereof for solving the aforementioned problem, is the image processing method as described regarding (1) or (2), characterized in that the upper limit of said range is the variance of noise of said original image.

According to the invention in this aspect, since, in addition to (1) or (2), the upper limit of the range is the variance of noise of the original image, filtering fitted for the structure of the original image can be performed.

(4) The present invention, in accordance with still another aspect thereof for solving the aforementioned problem, is the image processing method as described regarding any one of (1)–(3), characterized in that the method comprises: producing an image using as a new pixel value for said pixel of interest an average value of pixel values of the region for which the value of said variance is smallest when none of the values of the variance for said region in the plurality of modes falls within said range.

According to the invention in this aspect, since, in addition to any one of (1)–(3), an average value of pixel values of the region for which the value of the variance is smallest is used as a new pixel value for the pixel of interest when none of the values of the variance falls within the range, a pixel value which is relatively least inconsistent can be obtained.

(5) The present invention, in accordance with still another aspect thereof for solving the aforementioned problem, is an image processing apparatus characterized in that the apparatus comprises: region defining means for defining in a plurality of modes a local region containing a pixel of interest in an original image; variance calculating/deciding means for, sequentially for said region in the plurality of modes, obtaining the variance of pixel values and deciding whether the value of said variance falls within a predetermined range; and image producing means for producing an image using as a new pixel value for said pixel of interest an average value of pixel values of the region for which the value of said variance first falls within said range According to the invention in this aspect, since obtaining the variance of pixel values and deciding whether the value of the variance falls within a predetermined range are performed sequentially for a region in a plurality of modes, and an average value of pixel values of the region for which the value of the variance first falls within the range is used as a new pixel value for the pixel of interest, the number of calculations of the variance can be reduced, and the efficiency of filtering is improved.

(6) The present invention, in accordance with still another aspect thereof for solving the aforementioned problem, is the image processing apparatus as described regarding (5), characterized in that said region is a one-dimensional region.

According to the invention in this aspect, since, in addition to (5), the region for the variance calculation is a one-dimensional region, filtering which makes an edge-like structure distinct can be performed.

(7) The present invention, in accordance with still another aspect thereof for solving the aforementioned problem, is the image processing apparatus as described regarding (5) or (6), characterized in that the upper limit of said range is the variance of noise of said original image.

According to the invention in this aspect, since, in addition to (5) or (6), the upper limit of the range is the variance of noise of the original image, filtering fitted for the structure of the original image can be performed.

(8) The present invention, in accordance with still another aspect thereof for solving the aforementioned problem, is the image processing apparatus as described regarding any one of (5)–(7), characterized in that the apparatus comprises: another image producing means for producing an image using as a new pixel value for said pixel of interest an average value of pixel values of the region for which the value of said variance is smallest when none of the values of the variance for said region in the plurality of modes falls within said range.

According to the invention in this aspect, since, in addition to any one of (5)–(7), an average value of pixel values of the region for which the value of the variance is smallest is used as a new pixel value for the pixel of interest when none of the values of the variance falls within the range, a pixel value which is relatively least inconsistent can be obtained.

(9) The present invention, in accordance with still another aspect thereof for solving the aforementioned problem, is a recording medium characterized in that the medium records in a computer-readable manner a program for a computer to perform the functions of: defining in a plurality of modes a local region containing a pixel of interest in an original image; sequentially for said region in the plurality of modes, obtaining the variance of pixel values and deciding whether the value of said variance falls within a predetermined range; and producing an image using as a new pixel value for said pixel of interest an average value of pixel values of the region for which the value of said variance first falls within said range.

According to the invention in this aspect, since the program recorded on a recording medium makes a computer perform the functions of, sequentially for a region in a plurality of modes, obtaining the variance of pixel values and deciding whether the value of the variance falls within a predetermined range, and using as a new pixel value for the pixel of interest an average value of pixel values of the region for which the value of the variance first falls within the range, the number of calculations of the variance can be reduced, and the efficiency of filtering is improved.

(10) The present invention, in accordance with still another aspect thereof for solving the aforementioned problem, is the recording medium as described regarding (9), characterized in that said region is a one-dimensional region.

According to the invention in this aspect, since, in addition to (9), the region for the variance calculation is a one-dimensional region, filtering which makes an edge-like structure distinct can be performed.

(11) The present invention, in accordance with still another aspect thereof for solving the aforementioned problem, is the recording medium as described regarding (9) or (10), characterized in that the upper limit of said range is the variance of noise of said original image.

According to the invention in this aspect, since, in addition to (9) or (10) the upper limit of the range is the variance of noise of the original image, filtering fitted for the structure of the original image can be performed.

(12) The present invention, in accordance with still another aspect thereof for solving the aforementioned problem, is the recording medium as described regarding any one of (9)–(11), characterized in that the medium records in a computer-readable manner a program for a computer to perform the function of: producing an image using as a new pixel value for said pixel of interest an average value of pixel values of the region for which the value of said variance is smallest when none of the values of the variance for said region in the plurality of modes falls within said range.

According to the invention in this aspect, since, in addition to (9)–(11), the program makes a computer perform the function of using as a new pixel value for the pixel of interest an average value of pixel values of the region for which the value of the variance is smallest when none of the values of the variance falls within the range, a pixel value which is relatively least inconsistent can be obtained.

(13) The present invention, in accordance with still another aspect thereof for solving the aforementioned problem, is an imaging apparatus characterized in that the apparatus comprises: signal collecting means for collecting a signal from an object; original image producing means for producing an original image based on said collected signal; region defining means for defining in a plurality of modes a local region containing a pixel of interest in said original image; variance calculating/deciding means for, sequentially for said region in the plurality of modes, obtaining the variance of pixel values and deciding whether the value of said variance falls within a predetermined range; and image producing means for producing an image using as a new pixel value for said pixel of interest an average value of pixel values of the region for which the value of said variance first falls within said range.

According to the invention in this aspect, since obtaining the variance of pixel values of a captured original image and deciding whether the value of the variance falls within a predetermined range are performed sequentially for a region in a plurality of modes, and an average value of pixel values of the region for which the value of the variance first falls within the range is used as a new pixel value for the pixel of interest, the number of calculations of the variance can be reduced, and the efficiency of filtering is improved.

(14) The present invention, in accordance with still another aspect thereof for solving the aforementioned problem, is the imaging apparatus as described regarding (13), characterized in that said region is a one-dimensional region.

According to the invention in this aspect, since, in addition to (13), the region for the variance calculation is a one-dimensional region, filtering which makes an edge-like structure distinct can be performed.

(15) The present invention, in accordance with still another aspect thereof for solving the aforementioned problem, is the imaging apparatus as described regarding (13) or (14), characterized in that the upper limit of said range is the variance of noise of said original image.

According to the invention in this aspect, since, in addition to (13) or (14), the upper limit of the range is the variance of noise of the original image, filtering fitted for the structure of the original image can be performed.

(16) The present invention, in accordance with still another aspect thereof for solving the aforementioned problem, is the imaging apparatus as described regarding any one of (13)–(15), characterized in that the apparatus comprises: another image producing means for producing an image using as a new pixel value for said pixel of interest an average value of pixel values of the region for which the value of said variance is smallest when none of the values of the variance for said region in the plurality of modes falls within said range.

According to the invention in this aspect, since, in addition to any one of (13)–(15), an average value of pixel values of the region for which the value of the variance is smallest is used as a new pixel value for the pixel of interest when none of the values of the variance falls within the range, a pixel value which is relatively least inconsistent can be obtained.

(17) The present invention, in accordance with still another aspect thereof for solving the aforementioned problem, is the imaging apparatus as described regarding any one of (13)–(15), characterized in that said signal is a magnetic resonance signal.

According to the invention in this aspect, a magnetic resonance imaging apparatus can be provided comprising an image processing apparatus which efficiently performs filtering.

Therefore, the present invention can provide an image processing method and apparatus for efficiently performing filtering, a medium for recording a program for a computer to perform such an image processing function, and an imaging apparatus comprising such an image processing apparatus.

Further objects and advantages of the present invention will be apparent from the following description of the preferred embodiments of the invention as illustrated in the accompanying drawings.

DETAILED DESCRIPTION OF THE INVENTION

Figure 1:
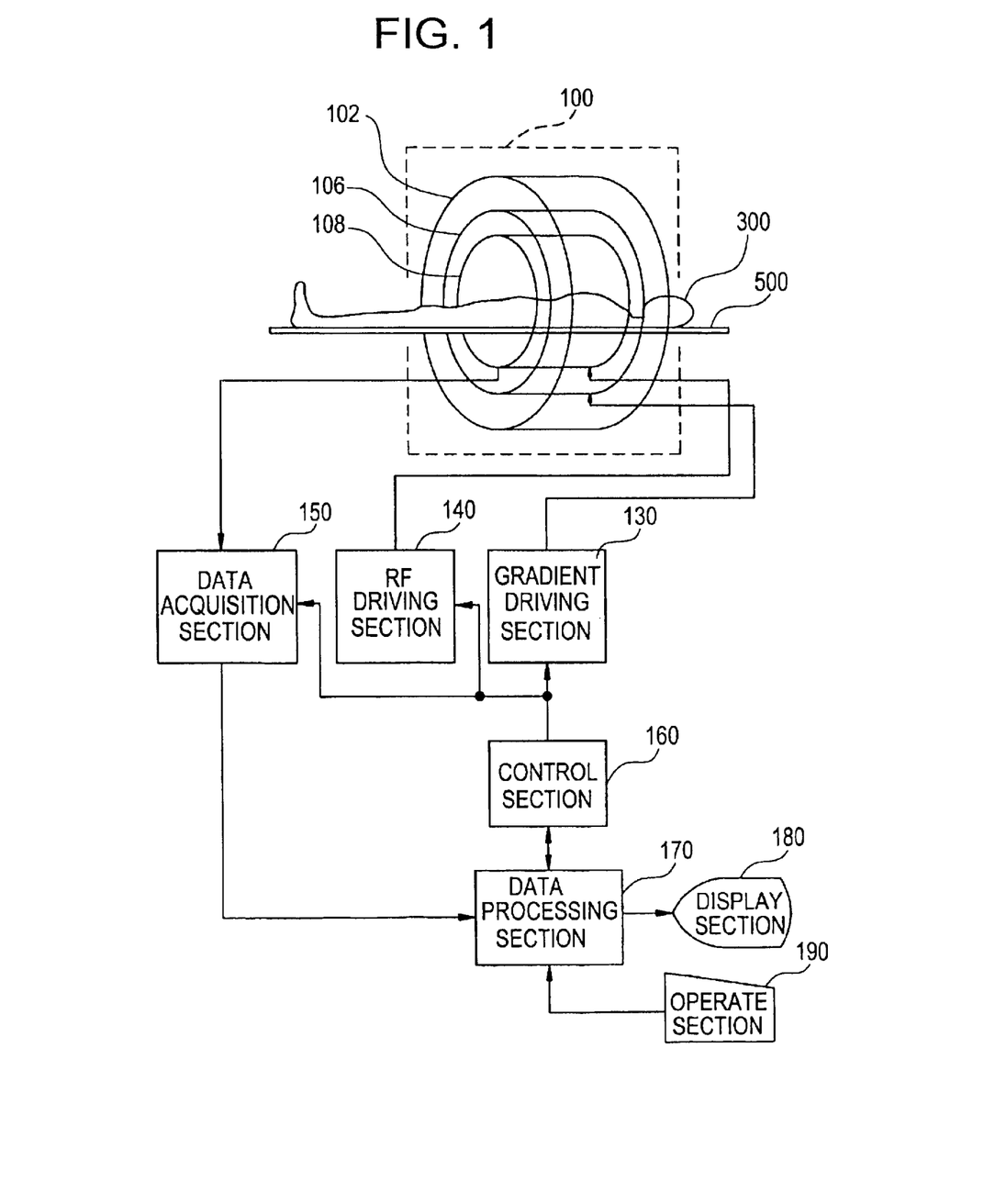
FIG. 1 is a block diagram of an apparatus in accordance with an embodiment of the present invention.

Several embodiments of the present invention will now be described in detail with reference to the accompanying drawings. FIG. 1 illustrates a block diagram of an imaging apparatus, which is an embodiment of the present invention. The configuration of the apparatus represents an embodiment of the apparatus in accordance with the present invention. The operation of the apparatus represents an embodiment of the method in accordance with the present invention.

As shown in FIG. 1, the present apparatus has a magnet system 100. The magnet system 100 has a main magnetic field coil section 102, a gradient coil section 106 and an RF (radio frequency) coil section 108. These coil sections have a generally cylindrical shape and are concentrically disposed. An object to be imaged 300 is rested on a cradle 500 and carried into and out of the generally cylindrical internal space (bore) of the magnet system 100 by carrier means, which is not shown.

The main magnetic field coil section 102 generates a static magnetic field in the internal space of the magnet system 100. The direction of the static magnetic field is generally in parallel with the direction of the body axis of the object 300. That is, a "horizontal" magnetic field is generated. The main magnetic field coil section 102 is made using a superconductive coil, for example. It will be easily recognized that the main magnetic field coil section 102 is not limited to the superconductive coil, but may be made using a normal conductive coil or the like.

The gradient coil section 106 generates gradient magnetic fields for imparting gradients to the static magnetic field strength. The gradient magnetic fields to be generated are the following three: a slice gradient magnetic field, a readout gradient magnetic field and a phase encoding gradient magnetic field. The gradient coil section 106 has three gradient coils, which are not shown, corresponding to these three gradient magnetic fields.

The RF coil section 108 generates a high frequency magnetic field for exciting spins within the object 300 in the static magnetic field space. The generation of the high frequency magnetic field will be referred to as transmission of an RF excitation signal hereinafter. The RF coil section 108 also receives electromagnetic wave, i.e., a magnetic resonance signal, generated by the excited spins.

The RF coil section 108 has transmission and receive coils, which are not shown. For the transmission and receive coils, the same coil or separate dedicated coils may be used.

The gradient coil section 106 is connected with a gradient driving section 130. The gradient driving section 130 supplies driving signals to the gradient coil section 106 to generate the gradient magnetic fields. The gradient driving section 130 has three driving circuits, which are not shown, corresponding to the three gradient coils in the gradient coil section 106.

The RF coil section 108 is connected with an RF driving section 140. The RF driving section 140 supplies driving signals to the RF coil section 108 to transmit the RF excitation signal, thereby exciting the spins within the object 300.

The RF coil section 108 is connected with a data acquisition section 150. The data acquisition section 150 gathers receive signals received by the RF coil section 108 and acquires the signals as view data.

The gradient driving section 130, RF driving section 140 and data acquisition section 150 are connected with a control section 160. The control section 160 controls the gradient driving section 130—the data acquisition section 150 to carry out imaging.

A portion consisting of the magnet system 100, gradient driving section 130, RF driving section 140, data acquisition section 150 and control section 160 is an embodiment of the signal collecting means of the present invention.

The output of the data acquisition section 150 is connected to a data processing section 170. The data processing section 170 is made using, for example, a computer. The data processing section 170 has a memory, which is not shown. The memory stores programs for the data processing section 170 and several kinds of data. The function of the present apparatus is achieved by the data processing section 170 executing a program stored in the memory.

The data processing section 170 stores data gathered from the data acquisition section 150 into the memory. A data space is formed in the memory. The data space constitutes a two-dimensional Fourier space. The data processing section 170 performs a two-dimensional inverse Fourier transformation on the data in the two-dimensional Fourier space to produce (reconstruct) an image of the object 300. The two-dimensional Fourier space will be sometimes referred to as a k-space hereinbelow. The data processing section 170 is an embodiment of the original image producing means of the present invention.

The data processing section 170 also has a function of filtering the reconstructed image. The data processing section 170 is an embodiment of the image processing apparatus of the present invention. The filtering function of the data processing section 170 will be described later in more detail.

The data processing section 170 is connected to the control section 160. The data processing section 170 is above the control section 160 and controls it. The data processing section 170 is connected with a display section 180 and an operating section 190. The display section 180 comprises a graphic display, etc. The operating section 190 comprises a keyboard, etc., provided with a pointing device.

The display section 180 displays the reconstructed image and several kinds of information output from the data processing section 170. The operating section 190 is operated by a human operator, and the section 190 inputs several commands, information and so forth to the data processing section 170. The operator interactively operates the present apparatus via the display section 180 and operating section 190.

Figure 2:
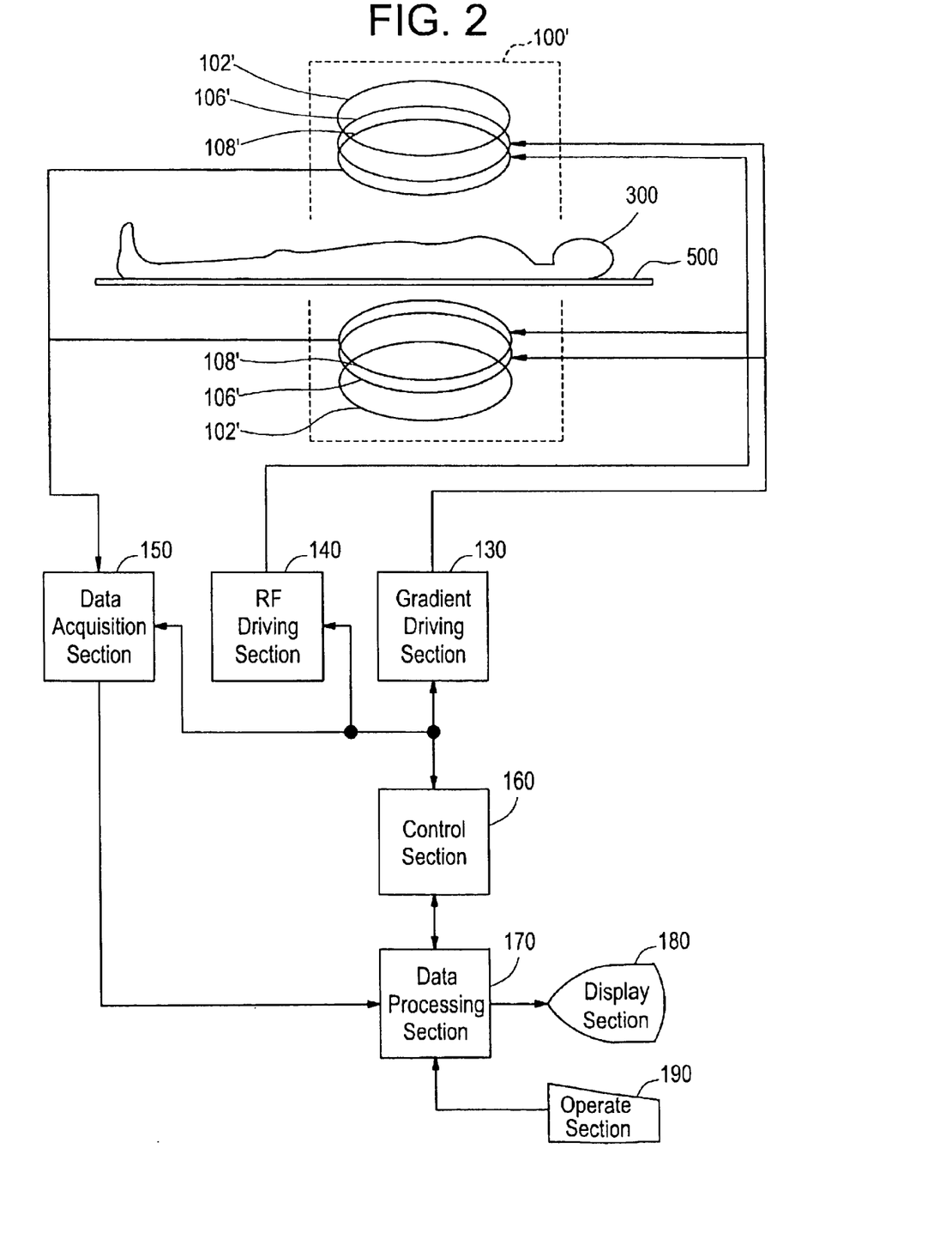
FIG. 2 is a block diagram of an apparatus in accordance with an embodiment of the present invention.

FIG. 2 illustrates a block diagram of an imaging apparatus of another type, which is another embodiment of the present invention. The configuration of the apparatus represents an embodiment of the apparatus in accordance with the present invention. The operation of the apparatus represents an embodiment of the method in accordance with the present invention.

The apparatus shown in FIG. 2 has a magnet system 100' of a type different from that in the apparatus shown in FIG. 1. Since the apparatus has the configuration similar to that of the apparatus shown in FIG. 1 except the magnet system 100', similar portions are designated by similar reference numerals and the explanation thereof will be omitted.

The magnet system 100' has a main magnetic field magnet section 102', a gradient coil section 106' and an RF coil section 108'. The main magnetic field magnet section 102' and the coil sections each comprises a pair of members facing each other across a space. These sections have a generally disk-like shape and are disposed to have a common center axis. The object 300 is rested on the cradle 500 and carried into and out of the internal space (bore) of the magnet system 100' by carrier means, which is not shown.

The main magnetic field magnet section 102' generates a static magnetic field in the internal space of the magnet system 100'. The direction of the static magnetic field is generally orthogonal to the direction of the body axis of the object 300. That is, a "vertical" magnetic field is generated. The main magnetic field magnet section 102' is made using a permanent magnet, for example. It will be easily recognized that the main magnetic field magnet section 102' is not limited to the permanent magnet, but may be made using a super or normal conductive electromagnet or the like.

The gradient coil section 106' generates gradient magnetic fields for imparting gradients to the static magnetic field strength. The gradient magnetic fields to be generated are the following three: a slice gradient magnetic field, a readout gradient magnetic field and a phase encoding gradient magnetic field. The gradient coil section 106' has three gradient coils, which are not shown, corresponding to these three gradient magnetic fields.

The RF coil section 108' transmits an RF excitation signal for exciting spins within the object 300 in the static magnetic field space. The RF coil section 108' also receives a magnetic resonance signal generated by the excited spins. The RF coil section 108' has transmission and receive coils, which are not shown. For the transmission and receive coils, the same coil or separate dedicated coils may be used.

A portion consisting of the magnet system 100', gradient driving section 130, RF driving section 140, data acquisition section 150 and control section 160 is an embodiment of the signal collecting means of the present invention.

Figures 3A, 3B:
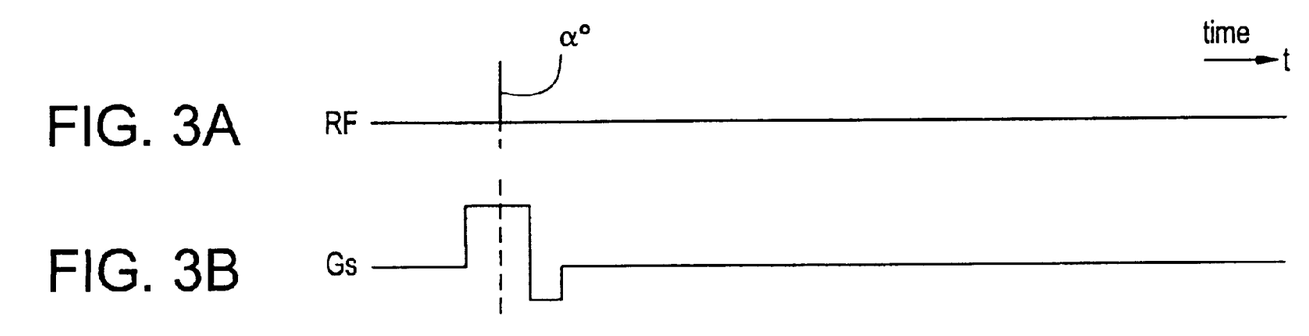
FIG. 3 is a diagram illustrating an exemplary pulse sequence executed by the apparatus shown in FIG. 1 or 2.
Figures 3C, 3D:
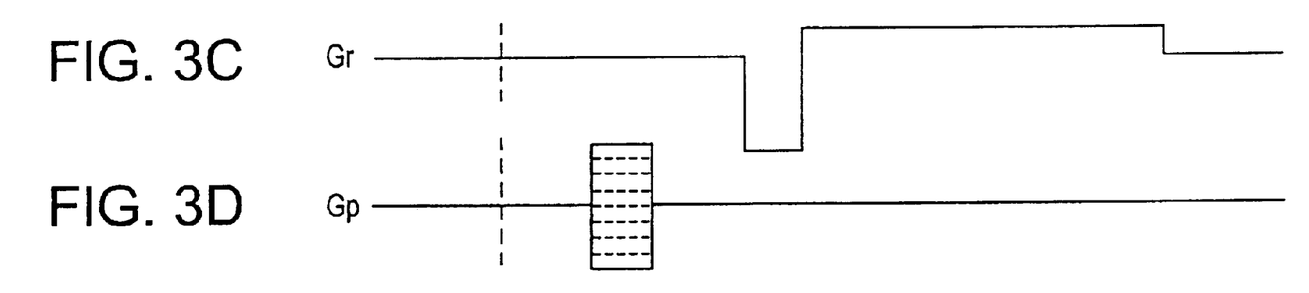
Figure 3E:
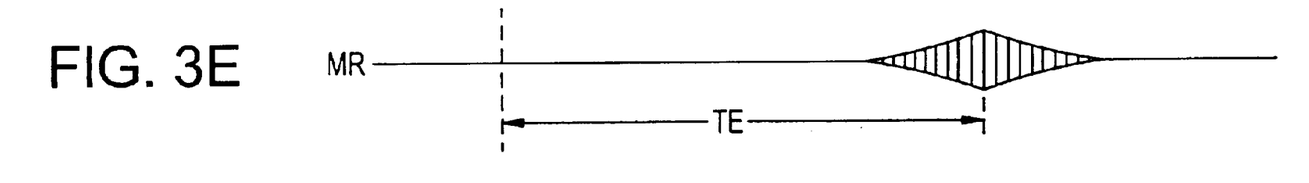
Figure 4A:
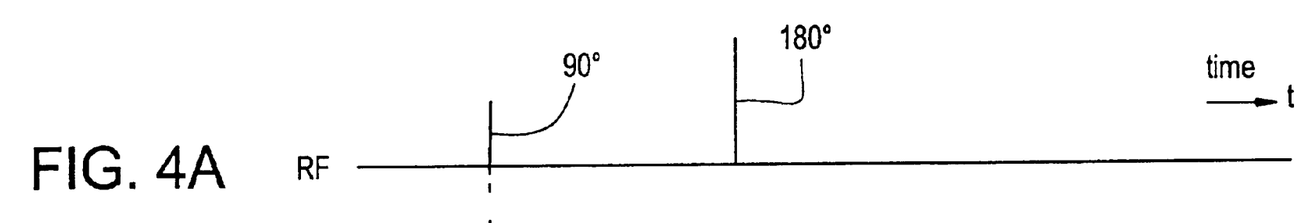
FIG. 4 is a diagram illustrating an exemplary pulse sequence executed by the apparatus shown in FIG. 1 or 2.
Figure 4B:
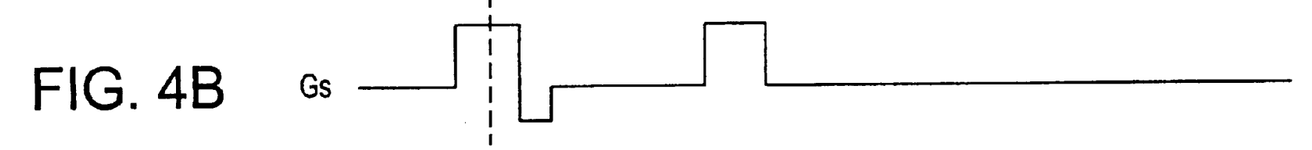
Figure 4C:
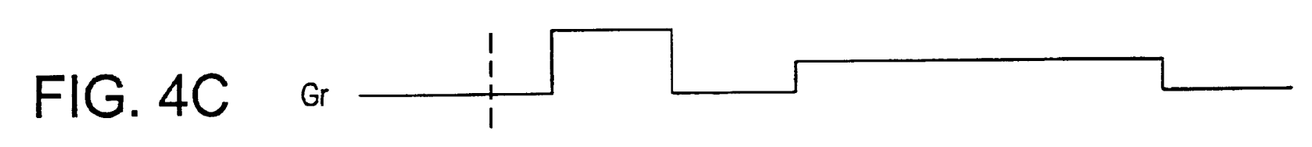
Figure 4D:
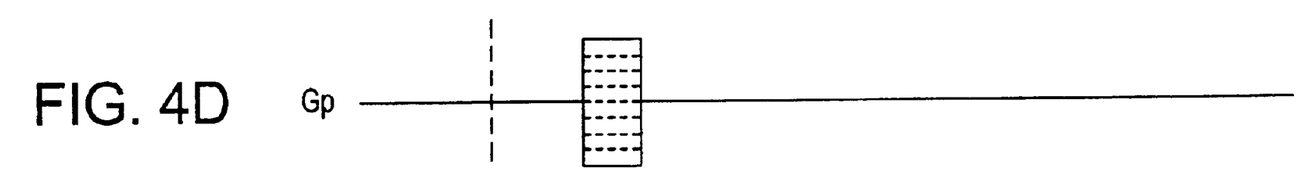
Figure 4E:
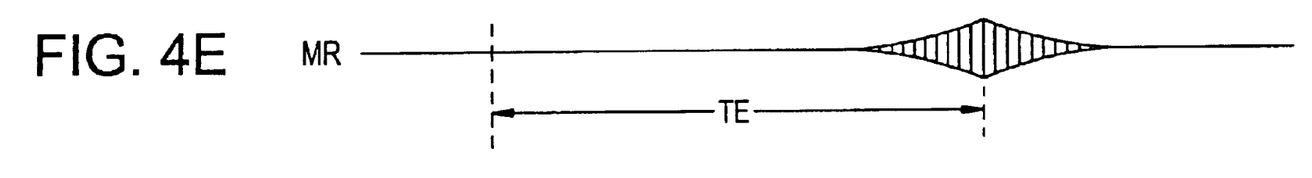

FIG. 3 illustrates an exemplary pulse sequence for use in magnetic resonance imaging. The pulse sequence is one in accordance with a gradient echo (GRE) technique.

Specifically, (1) is a sequence of an $\alpha°$ pulse for RF excitation of the GRE technique, and (2), (3), (4) and (5) are sequences of a slice gradient Gs, a readout gradient Gr, a phase encoding gradient Gp and a gradient echo MR, respectively, of the GRE technique. It should be noted that the $\alpha°$ pulse is represented by its central signal. The pulse sequence proceeds from the left to the right along a time axis t.

As shown, the $\alpha°$ pulse achieves $\alpha°$ excitation of the spins, wherein the flip angle $\alpha°$ is not greater than 90°. At the same time, the slice gradient Gs is applied to achieve selective excitation for a certain slice.

After the $\alpha°$ excitation, the spins are phase-encoded by the phase encoding gradient Gp. Next, the spins are first dephased and are subsequently rephased by the readout gradient Gr to generate a gradient echo MR. The gradient echo MR has its maximum signal intensity at a time point after an echo time TE from the $\alpha°$ excitation. The gradient echo MR is collected by the data acquisition section 150 as view data.

Such a pulse sequence is repeated 64–512 times in a cycle of TR (repetition time). The phase encoding gradient Gp is varied for each repetition to provide a different phase encoding each time. Thus, view data for 64–512 views filling the k-space are obtained.

Another example of the magnetic resonance imaging pulse sequence is illustrated in FIG. 4. The pulse sequence is one in accordance with a spin echo (SE) technique.

Specifically, (1) is a sequence of 90° and 180° pulses for RF excitation of the SE technique, and (2), (3), (4) and (5) are sequences of a slice gradient Gs, a readout gradient Gr, a phase encoding gradient Gp and a spin echo MR, respectively, of the SE technique. It should be noted that the 90° and 180° pulses are represented by their respective central signals. The pulse sequence proceeds from the left to the right along a time axis t.

As shown, the 90° pulse achieves 90° excitation of the spins. At the same time, the slice gradient Gs is applied to achieve selective excitation for a certain slice. After a predetermined time from the 90° excitation, 180° excitation by the 180° pulse, or spin inversion, is performed. Again, the slice gradient Gs is applied at the same time to achieve selective inversion for the same slice.

During the period between the 90° excitation and the spin inversion, the readout gradient Gr and phase encoding gradient Gp are applied. The readout gradient Gr dephases the spins. The phase encoding gradient Gp phase-encodes the spins.

After the spin inversion, the spins are rephased by the readout gradient Gr to generate a spin echo MR. The spin echo MR has its maximum signal intensity at a time point after TE from the 90° excitation. The spin echo MR is collected by the data acquisition section 150 as view data. Such a pulse sequence is repeated 64–512 times in a cycle of TR. The phase encoding gradient Gp is varied for each repetition to provide a different phase encoding each time. Thus, view data for 64–512 views filling the k-space are obtained.

It should be noted that the pulse sequence employed in the imaging is not limited to that of the GRE or SE technique, but may be of any other appropriate technique, such as FSE (fast spin echo), fast recovery FSE and echo planar imaging (EPI) techniques.

The data processing section 170 performs a two-dimensional inverse Fourier transformation on the view data in the k-space to reconstruct a tomographic image of the object 300. The reconstructed image is stored in the memory, and displayed by the display section 180.

In order to remove noise in an image, filtering of the image is performed in the data processing section 170. The filtering may be performed as a part of the image reconstruction, or may be performed by the operator making a selection based on the result of observation of the reconstructed image.

Figure 5:
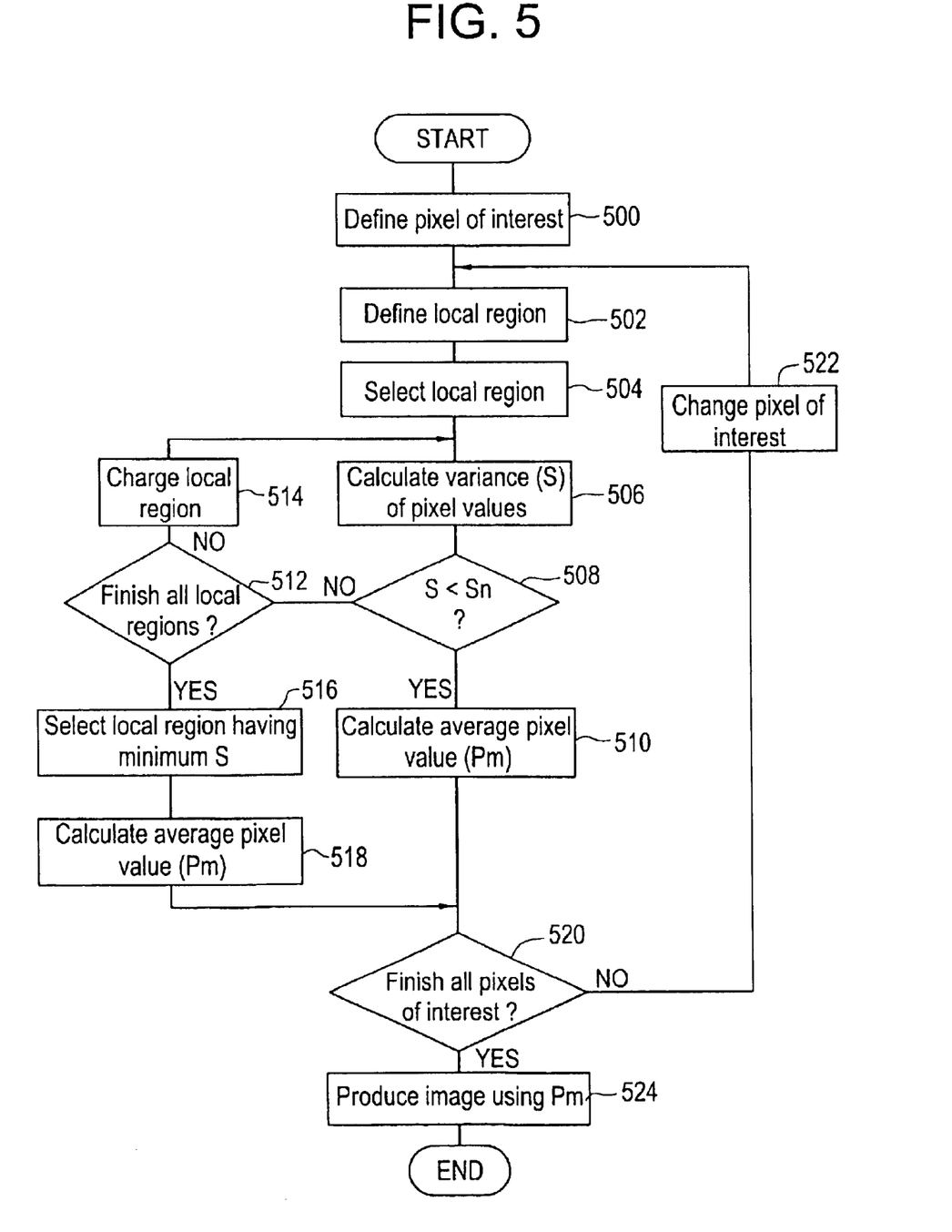
FIG. 5 is a flow chart of image processing performed by the apparatus shown in FIG. 1 or 2.

FIG. 5 shows a flow chart of an image filtering operation by the data processing section 170. As shown, a pixel of interest is defined in an original image at Step 500. The pixel of interest is a pixel whose value is to be determined by the filtering hereafter, and one pixel in the original image is defined as the pixel of interest. For example, a pixel at the center of the original image is defined as the first pixel.

Next, at Step 502, a local region is defined in the original image. The local region is one containing the pixel of interest. The local region is defined as, for example, a one-dimensional series of pixels. However, the local region is not limited to being defined in such a manner, but may be any other appropriate one. The data processing section 170 for performing the process of Step 502 is an embodiment of the region defining means of the present invention.

Figure 6:
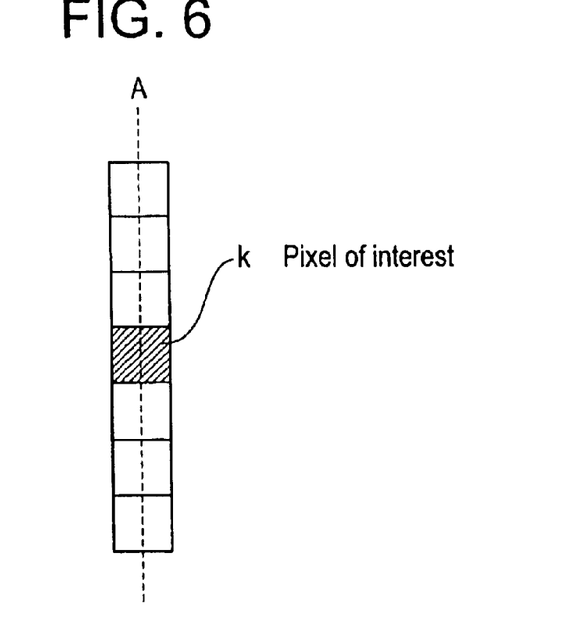
FIG. 6 illustrates the concept of a local region.

The local region is defined in a plurality of modes. Exemplary modes in defining the local region are shown in FIGS. 6–9. As shown, in one mode, a region is defined consisting of, for example, seven pixels which are vertically concatenated, centering a pixel of interest k, as shown in FIG. 6. The local region will be referred to as a local region A. It should be noted the number of pixels is not limited to seven but may be any other appropriate number.

Figure 7:
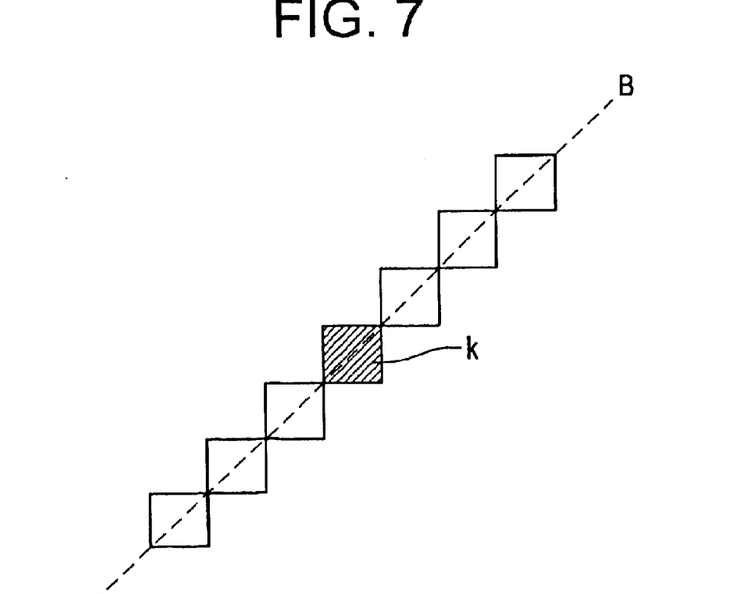
FIG. 7 illustrates the concept of a local region.
Figure 8:
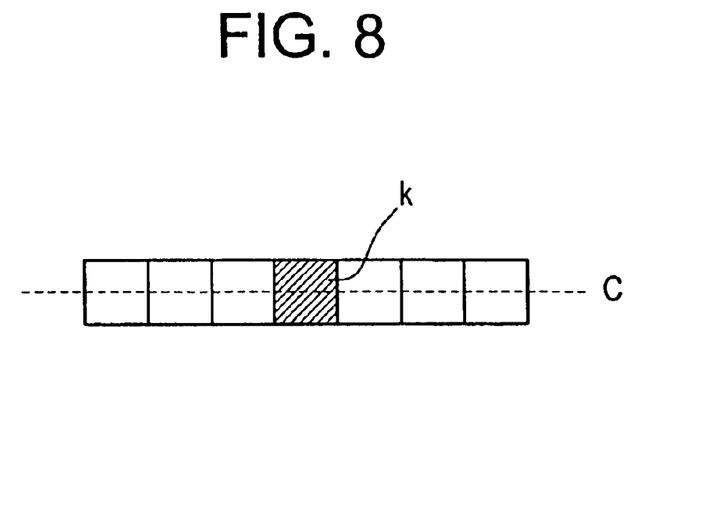
FIG. 8 illustrates the concept of a local region.
Figure 9:
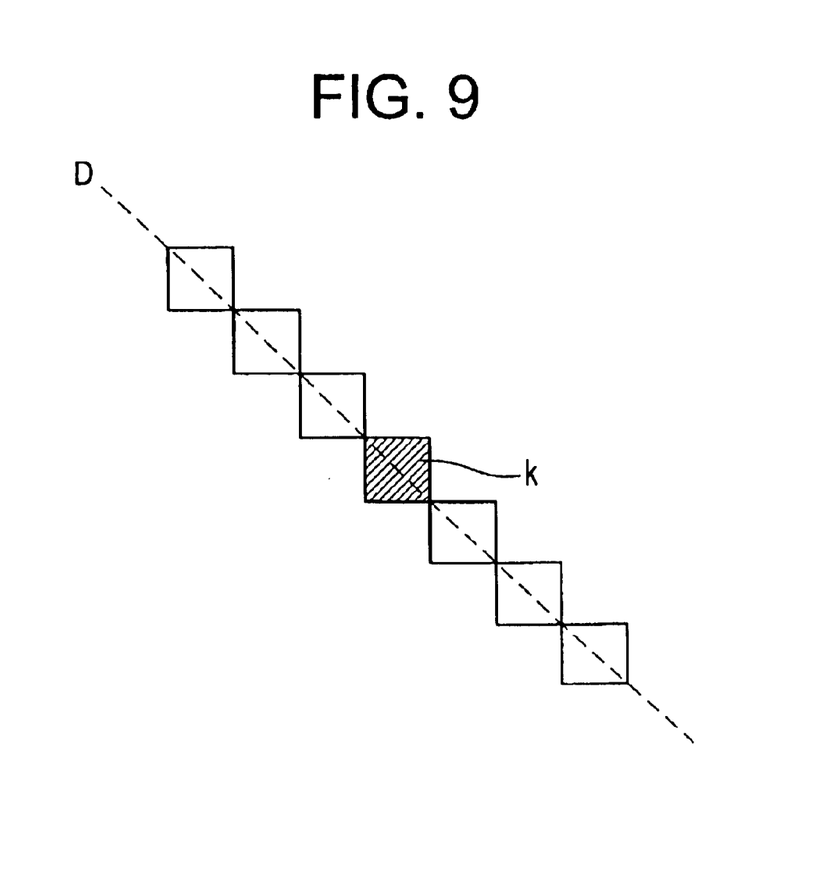
FIG. 9 illustrates the concept of a local region.

In other modes, a local region B consisting of seven pixels which are concatenated rising toward the right side in the 45° direction as shown in FIG. 7, a local region C consisting of seven pixels which are horizontally concatenated as shown in FIG. 8, and a local region D consisting of seven pixels which are concatenated rising toward the left side in the 45° direction as shown in FIG. 9, are defined. Each region has the pixel of interest k as a center pixel of the region. Thus, four local regions having different forms are defined.

Figure 10:
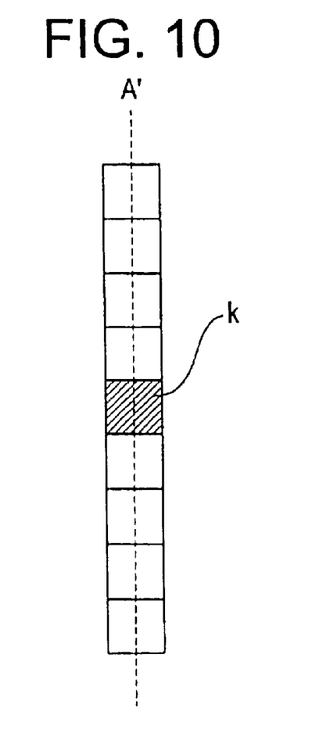
FIG. 10 illustrates the concept of a local region.

Other exemplary modes in defining the local region are shown in FIGS. 10–17. As shown, in one mode, a local region A' is defined consisting of, for example, nine pixels which are vertically concatenated, centering the pixel of interest k, as shown in FIG. 10.

Figure 11:
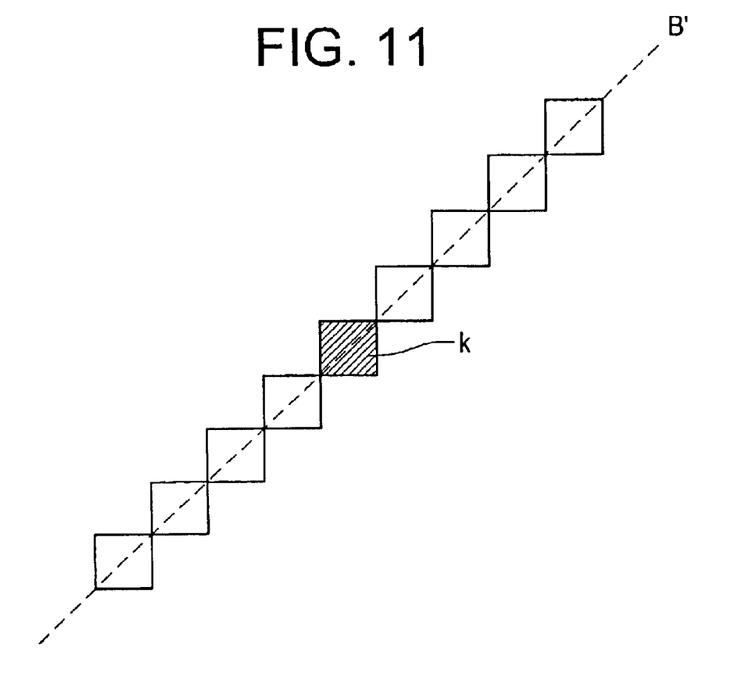
FIG. 11 illustrates the concept of a local region.
Figure 12:
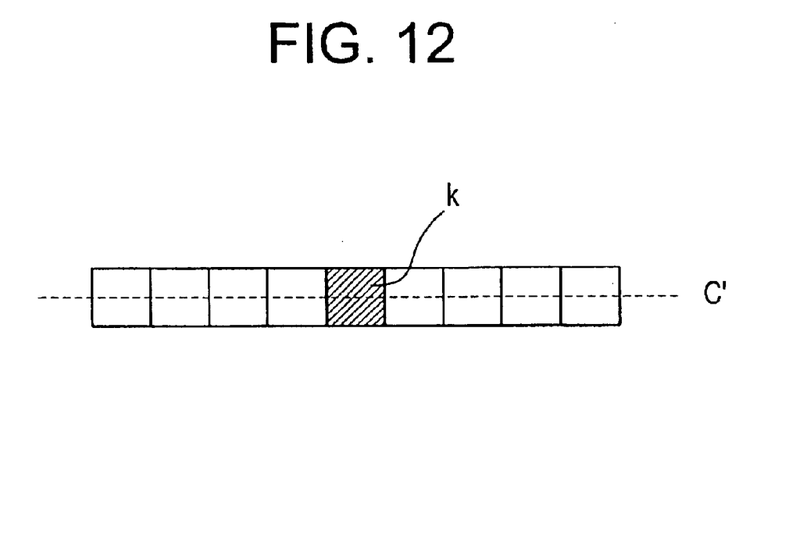
FIG. 12 illustrates the concept of a local region.
Figure 13:
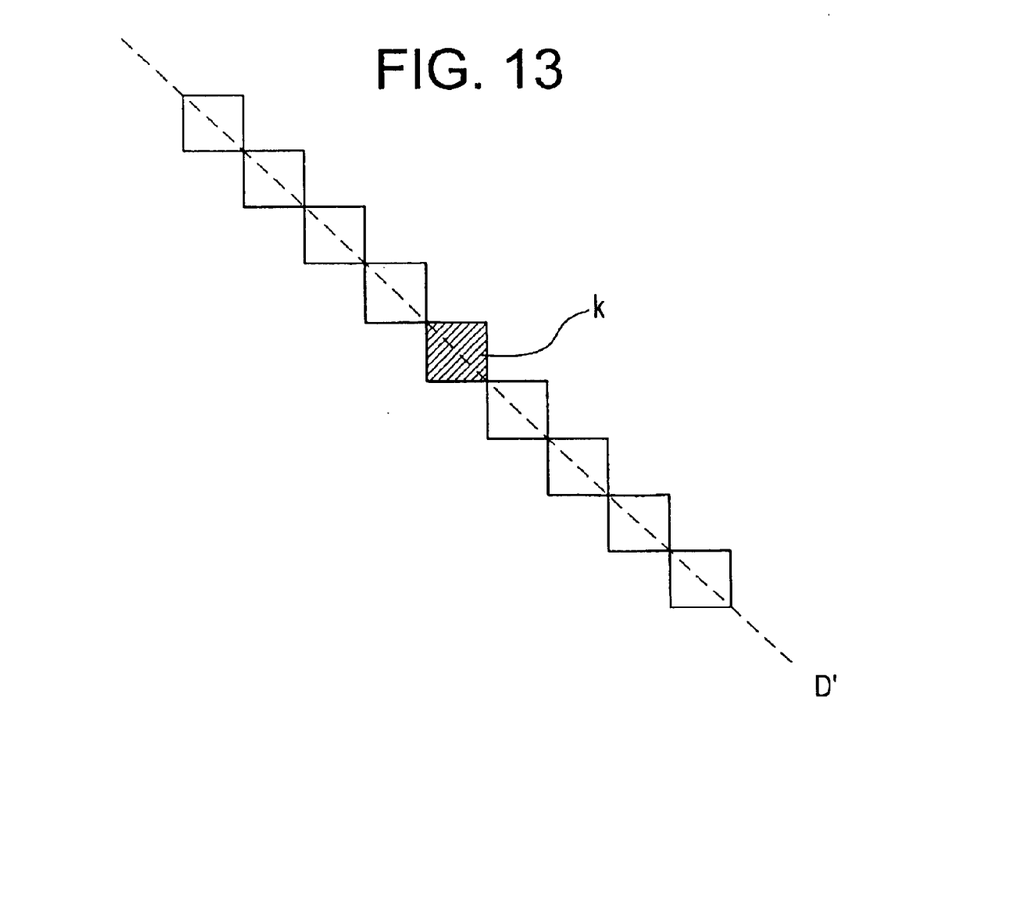
FIG. 13 illustrates the concept of a local region.
Figure 14:
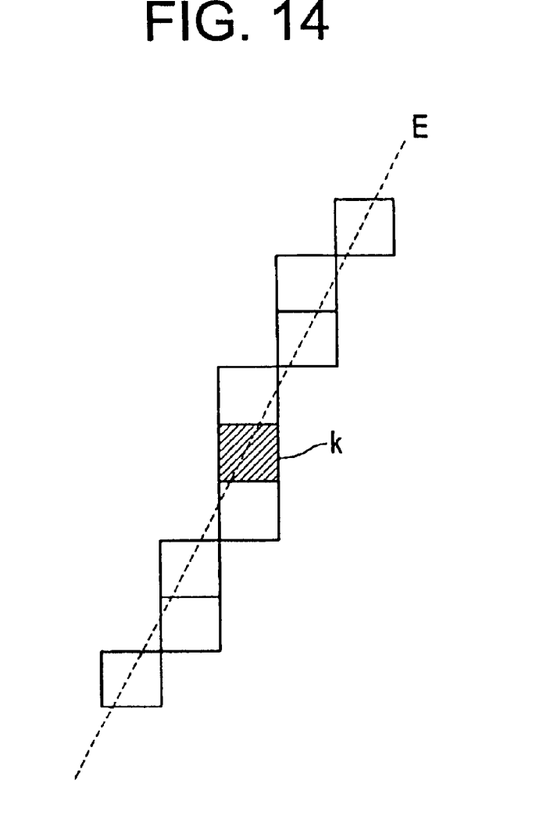
FIG. 14 illustrates the concept of a local region.
Figure 15:
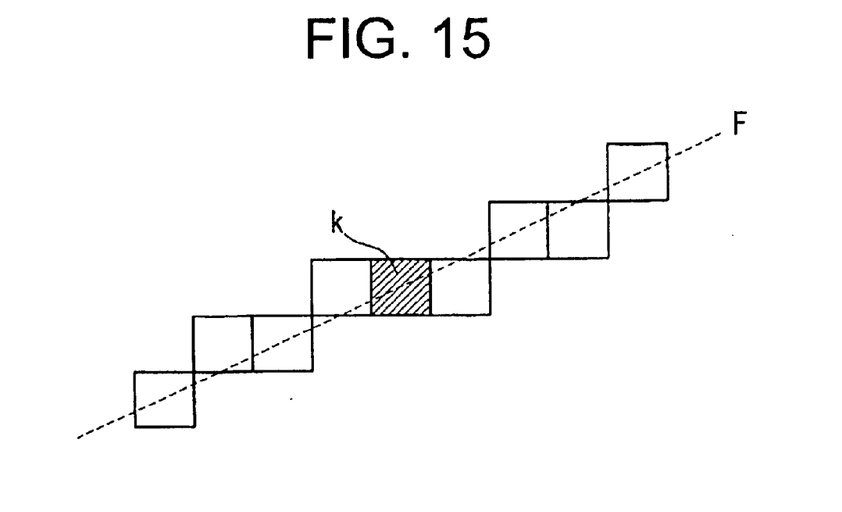
FIG. 15 illustrates the concept of a local region.
Figure 16:
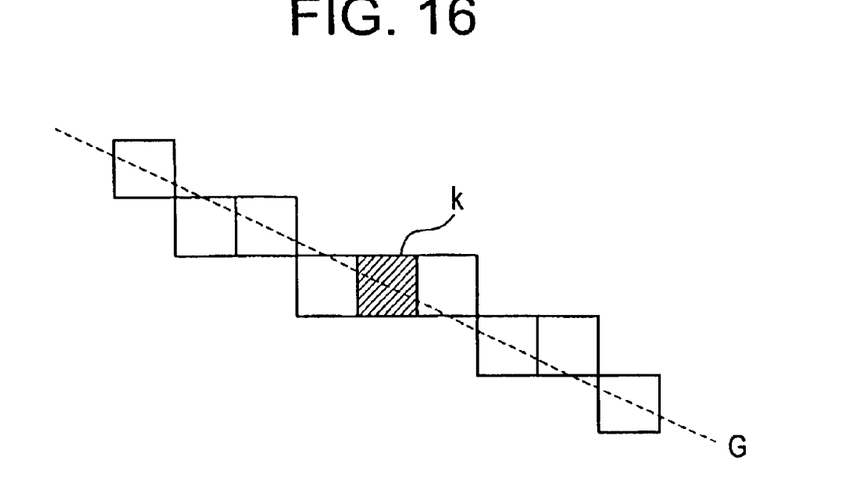
FIG. 16 illustrates the concept of a local region.
Figure 17:
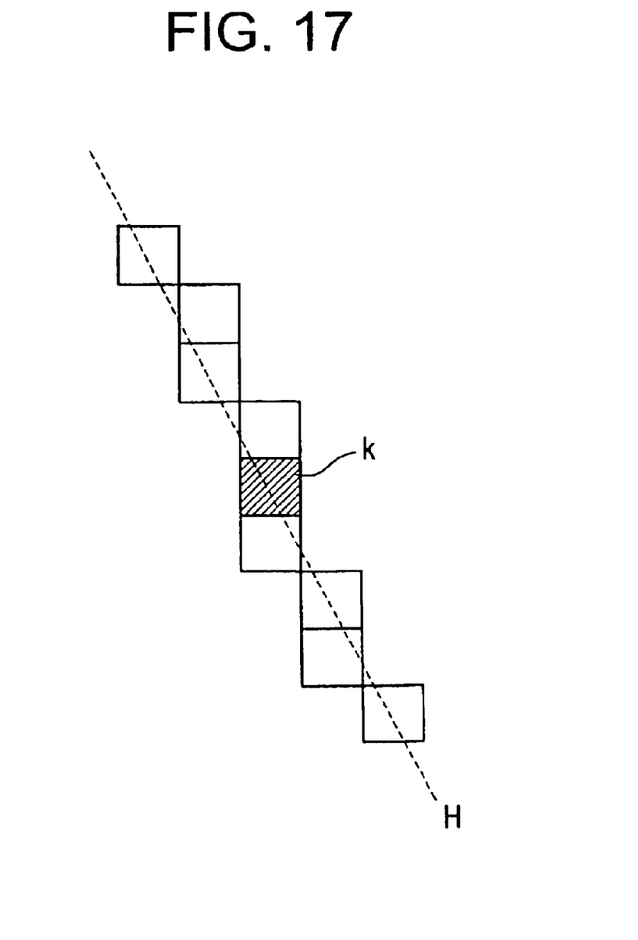
FIG. 17 illustrates the concept of a local region.

In other modes, a local region B' consisting of nine pixels which are concatenated rising toward the right side in the 45° direction as shown in FIG. 11, a local region C' consisting of nine pixels which are horizontally concatenated as shown in FIG. 12, a local region D' consisting of nine pixels which are concatenated rising toward the left side in the 45° direction as shown in FIG. 13, a local region E consisting of nine pixels which are concatenated rising toward the right side in the 67.5° direction as shown in FIG. 14, a local region F consisting of nine pixels which are concatenated rising toward the right side in the 22.5° direction as shown in FIG. 15, a local region G consisting of nine pixels which are concatenated rising toward the left side in the 22.5° direction as shown in FIG. 16, and a local region H consisting of nine pixels which are concatenated rising toward the left side in the 67.5° direction as shown in FIG. 17, are defined. Each region has the pixel of interest k as a center pixel of the region. Thus, eight local regions having different forms are defined.

Next, at Step 504, one of the local regions is selected. Thus, for example, the local region A is selected. When the eight local regions are defined as shown in FIGS. 10–17, the local region A' is selected, for example. Although the following description is made on an example in which the four local regions are defined as shown in FIGS. 6–9, the case in which the eight local regions are defined as shown in FIGS. 10–17 is processed in a similar manner.

Next, at Step 506, the variance of pixel values in the local region is calculated. The calculation of the variance employs the following equation:

$$S=(\Sigma(pi-\bar{P})^2)/N, \qquad (1)$$

wherein
Pi: a pixel value, and
N: the number of pixels.
Moreover, $\bar{P}$ is an average value of pixel values in the local region.

Next, at Step 508, a decision is made whether the variance of pixel values S is smaller than a predetermined threshold value Sn. For the threshold value Sn, the variance of noise of the original image, for example, is employed.

The threshold value Sn is not limited to the variance of noise but may be any other appropriately determined value. Alternatively, an acceptable range may be defined having a value of the variance of noise plus a constant value as an upper limit, and a value of the variance of noise minus a constant value as a lower limit. It should be noted that when the variance of noise Sn is defined as the upper limit, the acceptable range is Sn–0. The data processing section 170 for performing the processes of Steps 506 and 508 is an embodiment of the variance calculating/deciding means of the present invention.

When S is smaller than Sn or S falls within the acceptable range, an average pixel value of the local region Pm is obtained at Step 510, and the obtained value is used as a new pixel value for the pixel of interest k. The average pixel value Pm thus obtained is a pixel value fitted for the structure of the original image in the local region. The reason will now be explained.

In the local region A shown in FIG. 6, for example, if the structure of the original image matches this pixel series, that is, the structure is an edge in the vertical direction, for example, the pixel values in the local region A all have values representing the same structure (edge) of the original image.

In this condition, the variance of pixel values in the local region A is smaller than the variance of noise, or has a value within the acceptable range defined based on the variance of noise, and hence, the average pixel value Pm of the local region A can be used as the pixel value for the pixel of interest k.

Thus, a pixel value can be obtained which suitably reflects the structure (edge) of the original image in the local region A. Moreover, because the value is an average of the plurality of pixel values, noise can be removed. In other words, a pixel value can be obtained with noise removed while enhancing the structure of the original image.

When S is not smaller than S or S falls outside of the acceptable range, the local region A does not match the structure of the original image. Therefore, rather than performing the average value calculation, decision is made whether the local region in all the modes has been processed, at Step 512, and if not, the local region is changed at Step 514. Thus, a next local region, for example, the local region B, is selected.

Then, at Step 506, the variance of pixel values is calculated for the local region B at Step 506, and the obtained value is judged at Step 508. If the variance of pixel values satisfies the criterion, an average pixel value for the local region B is calculated at Step 510; otherwise, a next local region, for example, the local region C, is further selected at Steps 512, 514, and the calculation of the variance of pixel values and the judgement of the obtained value are performed at Steps 506, 508.

As long as the variance of pixel values does not satisfy the criterion, the local region is sequentially changed and the process of calculating the variance of pixel values and judging the obtained value is repeatedly performed. Once the variance of pixel values which satisfies the criterion is obtained, an average value Pm of the current local region is calculated and the value is used as a pixel value for the pixel of interest k.

Thus, once a value which satisfies the criterion is obtained, the calculation of the variance of pixel values and the judgement of the obtained value are omitted for the remaining local regions, and hence, the value for the pixel of interest k which is fitted for the structure of the original image can be efficiently obtained.

When none of the local regions A–D has the variance of pixel values which satisfies the criterion, a minimum value is extracted from the variances of pixel values which have been obtained, at Step 516, and a local region giving the minimum value is identified.

Next, at Step 518 the variance of pixel values of the local region is calculated. Thus, although not satisfying the criterion, a pixel value for the pixel of interest k can be obtained as an average value of pixel values of a local region which is relatively optimum for the structure of the original image.

After determining the pixel value for one pixel of interest in this manner, a decision is made whether the foregoing processes are finished for all the pixels of interest, at Step 520, and if not, the pixel of interest is changed at Step 522. A new pixel of interest is thus selected which is a pixel adjacent to the previous one, for example.

The processes of Steps 502–518 are performed on the new pixel of interest, and its pixel value is determined. Thereafter, all the pixels of interest in the original image are processed one by one in a similar manner. After determining the pixel values for all the pixels of interest, an image is produced by the determined pixel values Pm at Step 524.

The pixels of interest are all the pixels that constitute the original image. However, the pixels of interest are not limited thereto, but may be those in a predefined region such as, for example, a region of interest (ROI) in the original image, as needed. The data processing section 170 for performing the processes of Steps 510 and 524 is an embodiment of the image producing means of the present invention. The data processing section 170 for performing the processes of Steps 516, 518 and 524 is an embodiment of another image producing means of the present invention.

In the image thus produced, noise is reduced, and the structure of the original image in the local region is properly enhanced. In other words, an image with improved quality can be obtained by efficiently filtering the original image. The filtered image is stored in the memory, and is displayed on the display section 180.

A program for a computer to perform the functions as described above is recorded on a recording medium in a computer-readable manner. For the recording medium, for example, any one of a magnetic recording medium, an optical recording medium, a magneto-optical recording medium and any other appropriate type of recording medium is employed. The recording medium may be a semiconductor storage medium. A storage medium is synonymous with a recording medium in the present specification.

The preceding description has been made on an example in which the filtering of an image is performed by a data processing section in a magnetic resonance imaging apparatus; however, it will be easily recognized that the filtering may be performed by a data processing apparatus separate from the magnetic resonance imaging apparatus, such as an EWS (engineering workstation) or PC (personal computer).

Moreover, although the imaging apparatus has been described as being a magnetic resonance imaging apparatus, the imaging apparatus is not limited thereto but may be any other type of imaging apparatus, such as an X-ray CT (computed tomography) apparatus, an X-ray imaging apparatus, PET (positron emission tomography) or a γ-camera.

Furthermore, while the present invention has been described with reference to an example of processing a medical image, the object to be processed is not limited to the medical image, but the present invention can generally be applied to, for example, noise removal for a digital image captured by an optical instrument.

Many widely different embodiments of the invention may be configured without departing from the spirit and the scope of the present invention. It should be understood that the present invention is not limited to the specific embodiments described in the specification, except as defined in the appended claims.

What is claimed is:

1. An image processing method comprising the steps of:
defining a pixel of interest in an object;
defining a plurality of local regions, each of said local regions comprising a plurality of pixels disposed in a line;
defining a mode of each of said plurality of local regions, said mode being an angular disposition of said line;
selecting one of said plurality of local regions;
calculating variance (S) of pixel values of said pixel of interest of the selected one of said plurality of local regions;
comparing the calculated value of variance (S) with a desired value of variance (Sn), and
when the value of variance (S) is less than the desired value of variance (Sn), calculating ah average pixel value (Pm); and
producing an image using said average pixel value (Pm).

2. The method of claim 1, further comprising the steps of:
when the value of variance (S) is not less than the desired value of variance (Sn), determining whether all local regions are finished with processing; and
when all local regions are finished, selecting a local region having a minimum value of variance (S); and
calculating an average pixel value (Pm).

3. The method of claim 1, further comprising the steps of:
when the value of variance (S) is not less than the desired value of variance (Sn), determining whether all local regions are finished with processing; and
when all local regions are not finished, changing the local region.

4. The method of claim 1, further comprising the steps of:
determining whether all pixels of interest are finished with processing; and
when all pixels of interest are not finished with processing, changing the pixel of interest.

5. An image processing apparatus comprising:
means for defining a pixel of interest in an object;
means for defining a plurality of local regions, each of said local regions comprising a plurality of pixels disposed in a line;
means for defining a mode of each of said plurality of local regions, said mode being an angular disposition of said line;

means for selecting one of said plurality of local regions;

means for calculating variance (S) of pixel values of said pixel of interest of the selected one of said plurality of local regions;

means for comparing the calculated value of variance (S) with a desired value of variance (Sn);

means for calculating an average pixel value (Pm) when the value of variance (S) is less than the desired value of variance (Sn); and means for producing an image using said average pixel value (Pm).

6. The apparatus of claim 5, further comprising:

means for determining whether all local regions are finished with processing, when the value of variance (S) is not less than the desired value of variance (Sn):

means for selecting a local region having a minimum value of variance (S), when all local regions are finished with processing; and means for calculating an average pixel value (Pm).

7. The apparatus of claim 5, further comprising:

means for determining whether all local regions are finished with processing, when the values of variance (S) is not less than the desired value of variance (Sn); and means for changing the local region, when all local regions are not finished with processing.

8. The apparatus of claim 5, further comprising:

means for determining whether all pixels of interests are finished with processing; and means for changing the pixel of interest when all pixels of interest are not finished with processing.

9. A recording medium which records in a computer-readable manner a program for a computer to perform the functions of:

defining a pixel of interest in an object;

defining a plurality of local regions, each of said local regions comprising a plurality of pixels disposed in a line;

defining a mode of each of said plurality of local regions, said mode being an angular disposition of said line;

selecting one of said plurality of local regions;

calculating variance (S) of pixel values of said pixel of interest of the selected one of said plurality of local regions;

comparing the calculated value of variance (S) with a desired value of variance (Sn), and when the value of variance (S) is less than the desired value of variance (Sn), calculating an average pixel value (Pm); and producing an image using said average pixel value (Pm).

10. The recording medium of claim 9, comprising the further functions of:

when the value of variance (S) is not less than the desired value of variance (Sn), determining whether all local regions are finished with processing; and when all local regions are finished, selecting a local region having a minimum value of variance (S); and calculating an average pixel value (Pm).

11. The recording medium of claim 9, comprising the further functions of:

when the value of variance (S) is not less than the desired value of variance (Sn), determining whether all local regions are finished with processing; and when all local regions are not finished, changing the local region.

12. The recording medium of claim 9, comprising the further functions of:

determining whether all pixels of interest are finished with processing; and when all pixels of interest are not finished with processing, changing the pixel of interest.

13. An imaging apparatus comprising:

means for collecting a signal from an object;

means for producing an original image based on said collected signal;

means for defining a pixel of interest in said object;

means for defining a plurality of local regions, each of said local regions comprising a plurality of pixels disposed in a line;

means for defining a mode of each of said plurality of local regiois, said mode being an angular disposition of said line;

means for selecting one of said plurality of local regions;

means for calculating variance (S) of pixel values of said pixel of interest of the selected one of said plurality of local regions;

means for comparing the calculated value of variance (S) with a desired value of variance (Sn);

means for calculating an average pixel value (Pm) when the value of variance (S) is less than the desired value of variance (Sn); and means for producing an image using said average pixel value (Pm).

14. The apparatus of claim 13, further comprising:

means for determining whether all local regions are finished with processing, when the value of variance (S) is not less than the desired value of variance (Sn);

means for selecting a local region having a minimum value of variance (S), when all local regions are finished with processing; and means for calculating an average pixel value (Pm).

15. The apparatus of claim 13, further comprising:

means for determining whether all local regions are finished with processing, when the value of variance (S) is not less than the desired value of variance (Sn); and means for changing the local region, when all local regions are not finished with processing.

16. The apparatus of claim 13, further comprising:

means for determining whether all pixels of interests are finished with processing; and means for changing the pixel of interest when all pixels of interest are not finished with processing.

17. The apparatus of claim 13, wherein said signal is a magnetic resonance signal.

* * * * *